US012654539B2

(12) United States Patent
Ito et al.

(10) Patent No.: US 12,654,539 B2
(45) Date of Patent: Jun. 16, 2026

(54) HYBRID VEHICLE

(71) Applicant: TOYOTA JIDOSHA KABUSHIKI KAISHA, Toyota (JP)

(72) Inventors: Satoru Ito, Numazu (JP); Yoshiaki Miyazato, Shizuoka-ken (JP); Yosuke Suzuki, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 405 days.

(21) Appl. No.: 18/333,205

(22) Filed: Jun. 12, 2023

(65) Prior Publication Data

US 2023/0415561 A1 Dec. 28, 2023

(30) Foreign Application Priority Data

Jun. 28, 2022 (JP) ................................. 2022-103285

(51) Int. Cl.
| | |
|---|---|
| *B60K 6/445* | (2007.10) |
| *B60K 6/365* | (2007.10) |
| *B60K 6/442* | (2007.10) |
| *B60K 6/52* | (2007.10) |
| *F16H 37/08* | (2006.01) |
| *B60K 17/354* | (2006.01) |
| *B60K 17/356* | (2006.01) |

(52) U.S. Cl.
CPC .............. *B60K 6/445* (2013.01); *B60K 6/365* (2013.01); *B60K 6/442* (2013.01); *B60K 6/52* (2013.01); *F16H 37/0806* (2013.01); *B60K 17/354* (2013.01); *B60K 17/356* (2013.01); *B60Y 2200/92* (2013.01)

(58) Field of Classification Search
CPC ........ B60K 6/365; B60K 6/387; B60K 6/445; B60K 6/442; B60W 10/08; B60W 10/06; B60W 10/20; Y02T 10/62; B60Y 2200/92; F16H 37/0806
See application file for complete search history.

(56) References Cited

U.S. PATENT DOCUMENTS

| | | | |
|---|---|---|---|
| 6,468,175 B1 | 10/2002 | Lehongre | |
| 6,935,985 B2 * | 8/2005 | Ishimaru ................. | F16H 3/663 |
| | | | 475/275 |
| 11,529,860 B2 * | 12/2022 | Wiener ................... | B60K 6/365 |
| 2001/0022245 A1 * | 9/2001 | Rogg .................... | B60W 20/00 |
| | | | 903/910 |

(Continued)

FOREIGN PATENT DOCUMENTS

| | | |
|---|---|---|
| JP | 2002-500978 A | 1/2002 |
| JP | 2013-35506 A | 2/2013 |
| JP | 2017-35991 A | 2/2017 |

*Primary Examiner* — James A English
(74) *Attorney, Agent, or Firm* — Sughrue Mion, PLLC

(57) ABSTRACT

A hybrid vehicle configured to reduce a power loss resulting from delivery of an engine torque to drive wheels. In the hybrid vehicle, a locking gear is reciprocated by an actuator between a locking position to be engaged with a flywheel gear and a disengagement position to be disengaged from the flywheel gear. An operating mode of the hybrid vehicle includes: a first mode in which the hybrid vehicle is propelled while engaging the locking gear with the flywheel gear; and a second mode in which the hybrid vehicle is propelled while disengaging the locking gear from the flywheel gear.

4 Claims, 10 Drawing Sheets

(56) References Cited

U.S. PATENT DOCUMENTS

| | | | |
|---|---|---|---|
| 2008/0305907 A1* | 12/2008 | Hendrickson | B60W 20/00<br>475/5 |
| 2012/0309575 A1* | 12/2012 | Buffet | B60K 6/445<br>475/5 |
| 2013/0066529 A1* | 3/2013 | Murayama | B60L 50/61<br>701/62 |
| 2017/0043656 A1* | 2/2017 | Hashimoto | B60K 6/40 |
| 2023/0027461 A1* | 1/2023 | Harada | B60W 20/19 |

* cited by examiner

INTERFERENCE

HYBRID VEHICLE

CROSS-REFERENCE TO RELATED APPLICATIONS

The present disclosure claims the benefit of Japanese Patent Application No. 2022-103285 filed on Jun. 28, 2022 with the Japanese Patent Office, the disclosure of which are incorporated herein by reference in its entirety.

BACKGROUND

Field of the Invention

Embodiments of the present disclosure relate to a hybrid vehicle in which a prime mover includes an internal combustion engine and an electric motor.

Discussion of the Related Art

JP-A-2013-035506 describes one example of a hybrid vehicle comprising an engine, a first motor, a second motor, and a power split mechanism. In the hybrid vehicle described in JP-A-2013-035506, a torque generated by the engine is distributed to the first motor and a pair of drive wheels through the power split mechanism, and the second motor is connected to the drive wheels. According to the teachings of JP-A-2013-035506, in order to deliver a torque generated by the first motor, the hybrid vehicle is provided with an engagement device that selectively stops a rotation of an input element of the power split mechanism. Specifically, the engagement device comprises: a first gear meshing with gear teeth of a flywheel connected to an output shaft of the engine; a second gear meshing with gear teeth of a damper; a dog clutch that selectively engages the first and the second gears; and a one-way clutch that allows the second gear to rotate only in one direction. In the hybrid vehicle described in JP-A-2013-035506, therefore, the one-way clutch is brought into engagement by generating a drive torque by the first motor while releasing the dog clutch, and consequently the torque of the first motor is delivered to the drive wheels.

In order to propel the hybrid vehicle described in JP-A-2013-035506 by delivering the torque of the engine from the drive wheels, the flywheel and the damper are connected to each other by engaging the dog clutch. In this situation, the torque is delivered in order from the output shaft of the engine, the flywheel, the first gear meshing with the gear teeth of the flywheel, the dog clutch, the second gear meshing with the gear teeth of the damper, and the damper. However, mechanical loss is caused inevitably during propulsion due to slippage between gears thereby increasing a fuel consumption.

SUMMARY

Aspects of embodiments of the present disclosure have been conceived noting the foregoing technical problems, and it is therefore an object of the present disclosure to provide a hybrid vehicle configured to reduce a power loss resulting from delivery of an engine torque to drive wheels.

According to the exemplary embodiment of the present disclosure, there is provided a hybrid vehicle, comprising: an engine; a flywheel having an external gear that is connected to an output shaft of the engine; a motor; a power split mechanism that performs a differential action among a first rotary element connected to an output shaft of the flywheel, a second rotary element connected to the motor, and a third rotary element connected to a pair of drive wheels; a locking gear that is allowed to reciprocate between a locking position to be engaged with the external gear of the flywheel, and a disengagement position to be disengaged from the external gear of the flywheel; an actuator that pushes the locking gear to the engagement position so as to establish a brake torque counteracting a torque of the external gear of the flywheel, and that withdraws the locking gear from the external gear of the flywheel. According to the exemplary embodiment of the present disclosure, an operating mode of the hybrid vehicle may be selected from: a first mode in which the hybrid vehicle is propelled by a drive torque generated by the motor while positioning the locking gear in the locking position to engage the locking gear with the external gear of the flywheel and; and a second mode in which the hybrid vehicle is propelled while positioning the locking gear in the disengagement position to disengage the locking gear from the external gear of the flywheel.

In a non-limiting embodiment, the locking gear may be reciprocated between the locking position and the disengagement position along an axis parallel to a rotational center axis of the flywheel.

In a non-limiting embodiment, the hybrid vehicle may further comprise a controller that controls the motor. In addition, the controller may be configured to generate a torque by the motor to rotate the flywheel in a situation where the locking gear being pushed from the disengagement position toward the locking position does not reach the locking position within a threshold period.

In a non-limiting embodiment, the hybrid vehicle may further comprise a torque limiter that stops a rotation of the locking gear when a torque applied to the locking gear is less than an upper limit torque, and that allows the locking gear to rotate when the torque applied to the locking gear is equal to or the upper limit torque greater.

In a non-limiting embodiment, the hybrid vehicle may further comprise another motor that is connected to the pair of drive wheels or another pair of wheels in a torque transmittable manner. In addition, the first mode may include a mode in which the hybrid vehicle is propelled by the torque generated by the motor and a torque generated by the another motor.

Thus, in the hybrid vehicle according to the exemplary embodiment of the present disclosure, the external gear is formed around the flywheel connected to the first rotary element of the power split mechanism, and the locking gear is allowed to reciprocate between the locking position and the disengagement position. By moving the locking gear to the locking position, the locking gear is brought into engagement with the external gear of the flywheel to stop a rotation of the flywheel. Consequently, the hybrid vehicle is propelled in the first mode in which the torque of the motor is delivered to the drive wheels through the power split mechanism. Whereas, by withdrawing the locking gear from the locking position toward the disengagement position, the locking gear is disengaged from the external gear of the flywheel. Consequently, the hybrid vehicle is propelled in the second mode in which the torque of the engine is delivered to the drive wheels through the power split mechanism. Since the locking gear is disengaged from the external gear of the flywheel, a power loss resulting from rotating the locking gear may be reduced during propulsion in the second mode. In addition, since the external gear is formed around the flywheel whose diameter is relatively large, and a rotation of the flywheel is restricted by engaging the locking gear with the external gear, a load acting on the locking gear may be reduced. For this reason, the locking gear may be downsized.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 2 is a perspective view showing one example of a structure of a brake mechanism;

FIG. 3 is a cross-sectional view showing a cross-section of the brake mechanism shown in FIG. 2 along III-Ill line;

FIG. 4A is a schematic illustration showing a situation in which a locking gear is brought into engagement with a flywheel gear;

FIG. 4B is a schematic illustration showing a situation in which the locking gear is disengaged from the flywheel gear;

FIG. 4C is a schematic illustration showing a situation in which the locking gear is brought into contact with the flywheel gear;

FIG. 9A is a schematic illustration showing a situation in which a brake mechanism according to another example is in disengagement;

FIG. 9B is a schematic illustration showing a situation in which the brake mechanism according to another example is in engagement;

FIG. 10A is a schematic illustration showing a direction of a load applied to the locking gear in a situation where a torque of the first motor is delivered to a flywheel; and FIG. 10B is a schematic illustration showing a direction of a load applied to the locking gear in a situation where a torque of the engine is delivered to the flywheel.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
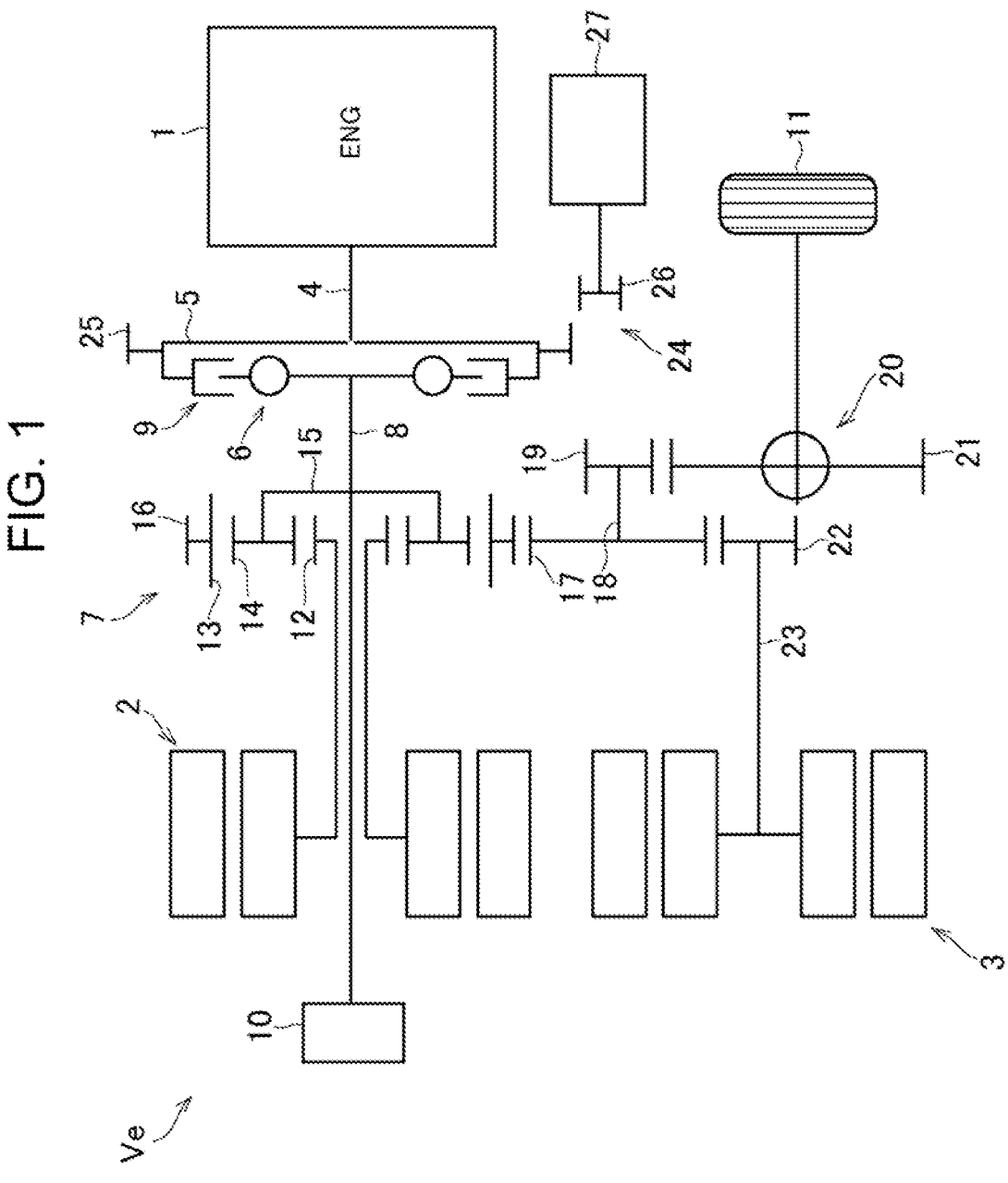
FIG. 1 is a skeleton diagram showing one example of a structure of the hybrid vehicle according to the exemplary embodiment of the present disclosure.

Turning now to FIG. 1, there is shown one example of a structure of a hybrid vehicle (hereinafter simply referred to as vehicle) Ve according to the exemplary embodiment of the present disclosure. As illustrated in FIG. 1, a prime mover of the vehicle Ve includes an engine (referred to as ENG in FIG. 1), a first motor (also referred to as MG1) serving as a motor of the exemplary embodiment of the present disclosure, and a second motor (also referred to as MG2) serving as another motor of the exemplary embodiment of the present disclosure.

The engine 1 generates a torque by burning an air/fuel mixture supplied thereto. For example, conventional gasoline engine and diesel engine may be employed as the engine 1.

As the conventional motors employed in electric vehicles and hybrid vehicles, each of the motors 2 and 3 serves as a motor to generate power when energized, and as a generator to generate electricity when rotated passively. For example, a permanent magnet synchronous motor and an induction motor may be adopted as the motors 2 and 3.

A flywheel 5 is mounted on an output shaft 4 of the engine 1, and an input shaft 8 of a power split mechanism 7 is connected to the flywheel 5 through a spring damper 6. In addition, a torque limiter 9 is interposed between the flywheel 5 and the spring damper 6. Therefore, the flywheel 5 and the spring damper 6 are allowed to rotate relatively to each other when a magnitude of the torque transmitted between the flywheel 5 and the spring damper 6 is greater than a limit torque. Consequently, the torque transmitted between the flywheel 5 and the spring damper 6 is limited to the limit torque or less.

The input shaft 8 of the power split mechanism 7 extends coaxially with the output shaft 4 of the engine 1. Specifically, a leading end of the input shaft 8 is joined to a mechanical oil pump 10, and the power split mechanism 7 is formed around an intermediate portion of the input shaft 8. That is, the input shaft 8 penetrates through the power split mechanism 7.

The power split mechanism 7 serves as a differential mechanism to distribute the torque of the input shaft 8 to the first motor 2 and a pair of drive wheels 11, and for example, a single-pinion planetary gear unit may be adopted as the power split mechanism 7. Specifically, the power split mechanism 7 comprises: a sun gear 12 as a second rotary element that is joined to the first motor 2; a ring gear 13 as a third rotary element that is arranged concentrically around the sun gear 12; a plurality of pinion gears 14 interposed between the sun gear 12 and the ring gear 13 while meshing with those gears; and a carrier 15 as a first rotary element that is mounted on the input shaft 8 to support the pinion gears 14 in a rotatable manner. In the power split mechanism 7, the sun gear 12, the ring gear 13, and the carrier 15 are allowed to rotate relatively to one another.

An output gear 16 is formed on an outer circumferential surface of the ring gear 13, and a driven gear 17 meshes with the output gear 16. Specifically, the driven gear 17 is mounted on one end of the counter shaft 18 extending parallel to the input shaft 8 to be meshed with the output gear 16, and a counter drive gear 19 is mounted on the other end of the counter shaft 18 to be meshed with a ring gear 21 of a differential gear unit 20 connected to the drive wheels 11. Here, it is to be noted that only one of the drive wheels 11 is illustrated in FIG. 1 for the sake of illustration.

The driven gear 17 also meshes with a drive gear 22 that is diametrically smaller than the driven gear 17, and the second motor 3 is connected to the drive gear 22. That is, the drive gear 22 is mounted on a leading end of an output shaft 23 of the second motor 3. Thus, the second motor 3 is connected to the drive wheels 11 so that a torque generated by the second motor 3 is delivered to the drive wheels 11.

An operating mode of the vehicle Ve may be selected from a hybrid mode (hereinafter abbreviated as HV mode) and an electric vehicle mode (hereinafter abbreviated as EV mode). In the HV mode, the torque of the engine 1 delivered to the power split mechanism 7 is partially delivered to the drive wheels 11 to propel the vehicle Ve by establishing a reaction torque counteracting the torque of the engine 1. In this situation, the carrier 15 serves as an input element, the sun gear 12 serves as a reaction element, and the ring gear 13 serves as an output element. In the HV mode, the torque of the second motor 3 may be added to the driven gear 17.

The EV mode may be selected from a single-motor mode and a dual-motor mode. In the single-motor mode, the vehicle Ve is propelled by generating a drive torque by the second motor 3 while stopping fuel supply to the engine 1 and electric power supply to the first motor 2. In the vehicle Ve, an inertia of the engine 1 is greater than an inertia of the first motor 2. In the single-motor mode, therefore, a rotation of the engine 1 is stops, and the first motor 2 idles at a speed in accordance with a speed of the vehicle Ve and a gear ratio of the power split mechanism 7.

In the dual-motor mode, the vehicle Ve is propelled by generating a drive torque by the first motor 2 while stopping fuel supply to the engine 1. Specifically, in the dual-motor mode, the carrier 15 serves as a reaction element, and the sun gear 12 serves as an input element. In order to allow the carrier 15 to serve as the reaction element and the sun gear 12 to serve as the input element, the vehicle Ve is provided with a brake mechanism 24 that selectively stops a rotation of the flywheel 5. Accordingly, the dual-motor mode corresponds to a first mode of the exemplary embodiment of the present disclosure, and the HV mode and the single-motor mode correspond to a second mode of the exemplary embodiment of the present disclosure.

Specifically, a flywheel gear 25 having external teeth is formed on an outer circumferential surface of the flywheel 5 to be meshed with a locking gear 26 of the brake mechanism 24. The locking gear 26 is held by a stationary member such as a casing (not shown) while being connected to an actuator 27 such as a motor so that the locking gear 26 is reciprocated by the actuator 27 in a direction parallel to the output shaft 4 and the input shaft 8 to be selectively engaged with the flywheel gear 25. That is, a brake torque counteracting a torque of the flywheel gear 25 is established by the locking gear 26 when the flywheel gear 25 is engaged with the locking gear 26.

In other words, a rotation of the carrier 15 is stopped by engaging the locking gear 26 with the flywheel gear 25. In this situation, the drive torque generated by the first motor 2 is delivered to the drive wheels 11 in accordance with the gear ratio of the power split mechanism 7. In the situation where the first motor 2 generates the drive torque, the drive torque generated by the second motor 3 is added principally to the driven gear 17, therefore, this operating mode is referred to as the dual-motor mode.

Figure 2:
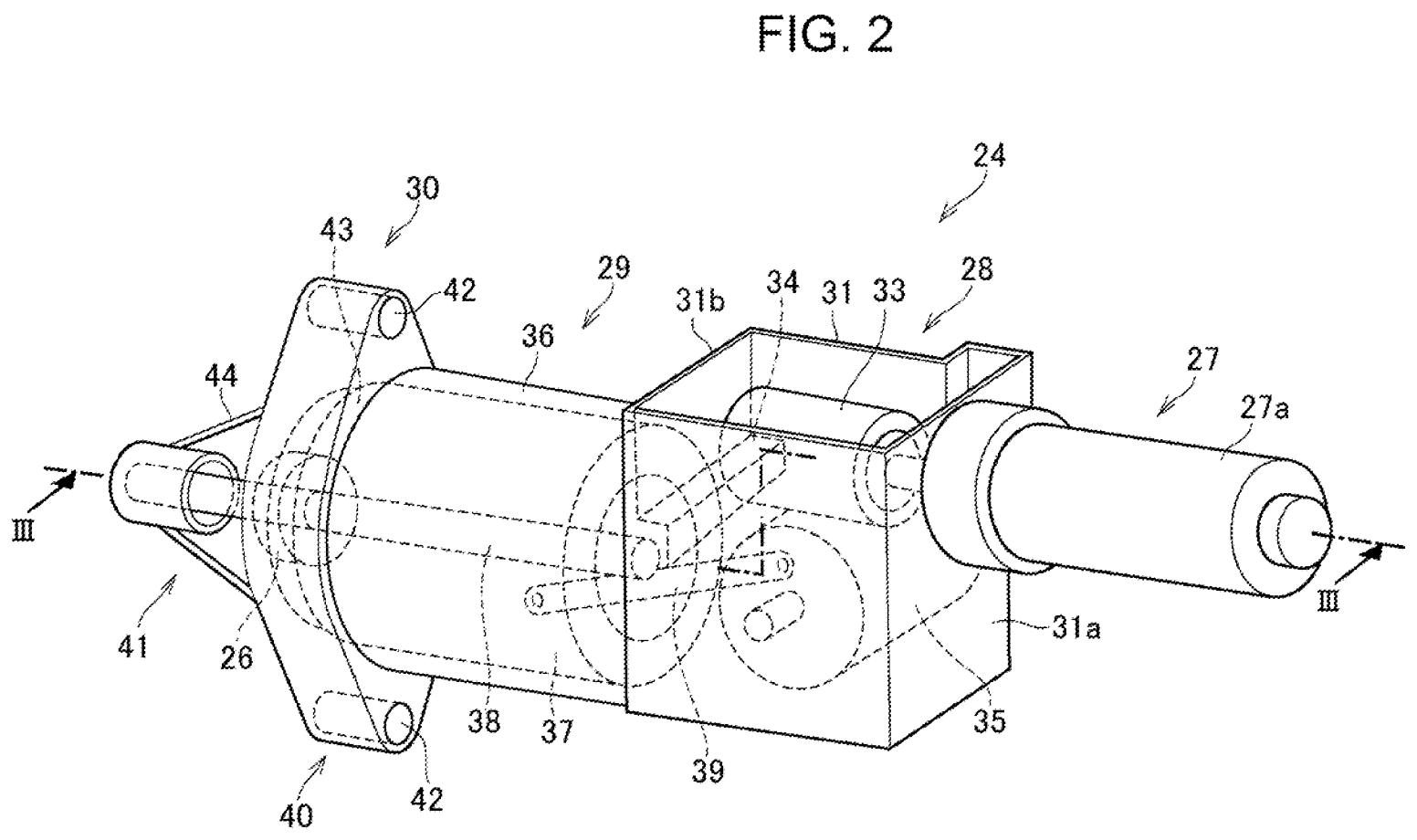
Figure 3:
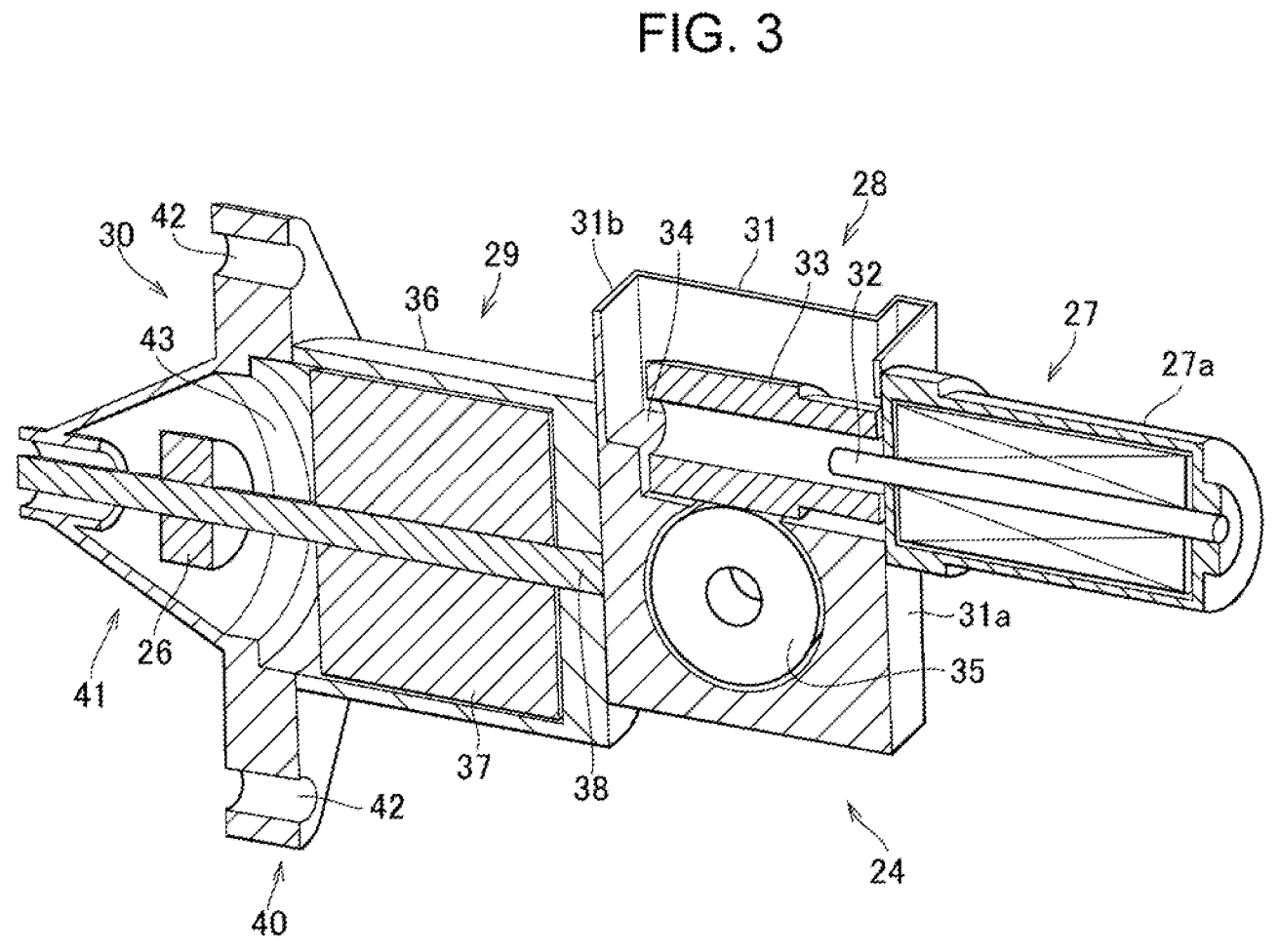

A structure of the brake mechanism 24 is shown in FIG. 2 in more detail, and a cross-section of the brake mechanism 24 along III-III line is shown in FIG. 3. As illustrated in FIGS. 2 and 3, the brake mechanism 24 comprises: a locking motor 27a serving as the actuator 27; a cam mechanism 28 that translates a rotary motion of the locking motor 27a into a linear motion along an axial direction; a torque limiter 29 that selectively stops a rotation of the locking gear 26: and a holder 30 holding the locking gear 26 therein. Specifically, the torque limiter 29 stops the rotation of the locking gear 26 by receiving a reaction force of the torque applied to the locking gear 26, and allows the locking gear 26 to rotate when the torque applied to the locking gear 26 is equal to a predetermined upper limit torque or greater.

For example, a direct current motor may be adopted as the locking motor 27a, and a direct current is supplied to the locking motor 27a from a battery (not shown). Specifically, the locking motor 27a is attached to a side surface 31a of a cam housing 31 holding the cam mechanism 28 therein. An output shaft 32 of the locking motor 27a extends into the cam housing 31, and a worm gear 33 is mounted on a leading end of the output shaft 32 to be rotated integrally therewith. A tip of the worm gear 33 is rotatably supported by a bulkhead 34 formed inside of the cam housing 31.

A wheel gear 35 is arranged in a lower space of the cam housing 31. Specifically, the wheel gear 35 is meshed with the worm gear 33 while being allowed to rotate around an axis perpendicular to a rotational center axis of the worm gear 33. That is, the worm gear 33 and the wheel gear 35 serve as a speed reducing mechanism so that a torque of the locking motor 27a is delivered to the wheel gear 35 while being multiplied. In other words, a rotational speed of the wheel gear 35 is reduced lower than a rotational speed of the locking motor 27a. Still in other words, a rotational angle of the wheel gear 35 is reduced smaller than a rotational angle of the locking motor 27a. An upper edge of the cam housing 31 is attached to an engine body (not shown) to be closed.

In the cam housing 31, a through hole is formed on another side surface 31b opposed to the side surface 31a to which the locking motor 27a is attached, and one end of a cylindrical limiter housing 36 is joined to another side surface 31b so that a hollow space of the limiter housing 36 is communicated with the through hole of the cam housing 31.

A frictional engagement member 37 is arranged in the limiter housing 36 to apply a frictional force to a support shaft 38 on which the locking gear 26 is mounted. Specifically, a rotation of the support shaft 38 is stopped by the frictional engagement member 37, that is, the support shaft 38 is integrated with the frictional engagement member 37 as long as the torque applied to the support shaft 38 is less than the upper limit torque. By contrast, the support shaft 38 is rotated relatively with respect to the frictional engagement member 37 when the torque applied thereto is equal to or greater the upper limit torque.

For example, the frictional engagement member 37 may be formed of a plurality of engagement plates formed on an inner circumferential surface of the limiter housing 36 at regular intervals. In this case, a plurality of annular plates are formed on the support shaft 38 alternately with the engagement plates of the frictional engagement member 37. The engagement plates of the frictional engagement member 37 and the annular plates of the support shaft 38 are frictionally engaged with each other so that the rotation of the support shaft 38 is stopped as long as the torque applied to the support shaft 38 is less than the upper limit torque.

In the example shown in FIG. 2, the frictional engagement member 37 is connected to the wheel gear 35 through a linkage 39 so that the frictional engagement member 37 is reciprocated together with the support shaft 38 in an axial direction of the support shaft 38. Specifically, one end of the linkage 39 is attached to a circular side surface of the wheel gear 35 in a pivotal manner eccentrically with respect to a rotational center axis of the wheel gear 35, and the other end of the linkage 39 is attached to the frictional engagement member 37 in a pivotal manner. In the example shown in FIG. 2, therefore, the frictional engagement member 37 is moved toward the left side by rotating the wheel gear 35 counterclockwise. In the case that the frictional engagement member 37 is formed of a plurality of the engagement plates, the sum of the clearances between the engagement plates of the frictional engagement member 37 and the annular plates of the support shaft 38 is set to a traveling amount of the support shaft 38 required to establish a desired frictional force acting between the engagement plates and the annular plates by pushing the annular plates onto the engagement plates.

The other end of the limiter housing 36 opposite to the cam housing 31 is joined to the holder 30. The holder 30 comprises a joint section 40 that is fixed to the engine body by a bolt (not shown), and a projection 41 in which the locking gear 26 held therein is exposed partially.

The joint section 40 has a hollow rhombus shape, and through holes 42 with the bolt inserted into each are formed on an upper portion and a lower portion in FIGS. 2 and 3. A hollow section 43 of the joint section 40 is communicated with the limiter housing 36, and the locking gear 26 is held in the hollow section 43. Specifically, an inner diameter of the hollow section 43 is larger than an outer diameter of the locking gear 26, and a leading end portion of the frictional engagement member 37 is also held ion the hollow section 43.

The projection 41 has a configuration such that the locking gear 26 held therein is exposed partially. Specifically, the projection 41 is formed into a conical shape, and a cutout 44 is formed on a predetermined site of the projection 41. The flywheel gear 25 is partially inserted into the projection 41 through the cutout 44 so that the locking gear 26 is meshed with the flywheel gear 25 by moving the locking gear 26 in the axial direction toward the flywheel gear 25.

In order to inhibit a rotation of the flywheel 5, the brake mechanism 24 rotates the wheel gear 35 counterclockwise in FIG. 2. Consequently, the frictional engagement member 37 is pushed toward the left side in FIG. 2 together with the support shaft 38 by the linkage 39. Eventually, the locking gear 26 is moved to the cutout 44 to be engaged with flywheel gear 25. In the case that the frictional engagement member 37 is formed of a plurality of the engagement plates, the engagement plates of the frictional engagement member 37 are brought into contact with the annular plates of the support shaft 38 to establish a brake torque counteracting the torque of the support shaft 38 by moving the locking gear 26 to the cutout 44.

Figures 4A, 4B, 4C:
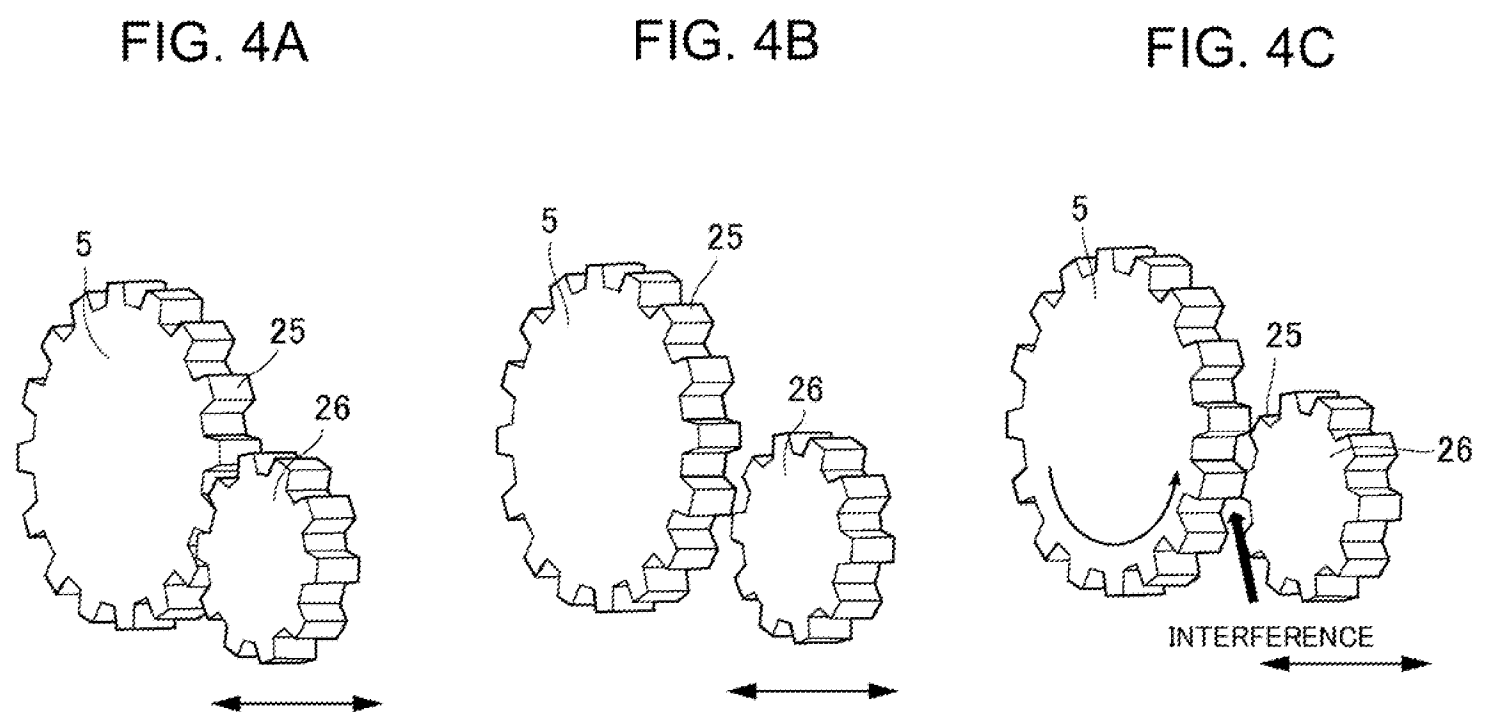

Positions of the flywheel gear 25 and the locking gear 26 in each situation are shown in FIGS. 4A to 4C. Specifically, FIG. 4A shows a situation in which the locking gear 26 is brought into engagement with the flywheel gear 25, FIG. 4B shows a situation in which the locking gear 26 is withdrawn from the flywheel gear 25, and FIG. 4C shows a situation in which the locking gear 26 is brought into contact with the flywheel gear 25.

As described, the locking gear 26 is selectively engaged with the flywheel gear 25 as illustrated in FIG. 4A and disengaged from the flywheel gear 25 as illustrated in FIG. 4B by actvating the locking motor 27a. However, if the locking gear 26 and the flywheel gear 25 are in phase with each other when the locking gear 26 is moved toward the flywheel gear 25 to be engaged therewith, as illustrated in FIG. 4C, one of top lands of the locking gear 26 comes into contact with one of top lands of the flywheel gear 25. In this situation, in order to allow the locking gear 26 to be engaged properly with the flywheel gear 25, a torque is applied to the flywheel gear 25 in the direction indicated by the arrow in FIG. 4C to rotate the flywheel gear 25 relatively to the locking gear 26.

Specifically, the torque is applied to the flywheel gear 25 from the first motor 2 via the power split mechanism 7. Consequently, the flywheel gear 25 is rotated relatively to the locking gear 26 so that the locking gear 26 is brought into engagement properly with the flywheel gear 25. In this situation, the torque of the first motor 2 is partially delivered to the drive wheels 11. Therefore, if the vehicle Ve is propelled forward in the drive range in this situation, it is preferable to generate the torque by the first motor 2 in a direction to propel the vehicle Ve in the forward direction. Whereas, if the vehicle Ve is reversed in the reverse range in this situation, it is preferable to generate the torque by the first motor 2 in a direction to reverse the vehicle Ve. By thus changing the direction of the torque of the first motor 2, the locking gear 26 is smoothly brought into engagement with the flywheel gear 25 while propelling the vehicle Ve in the desired direction. In addition, a control for engaging the locking gear 26 with the flywheel gear 25 can be simplified.

In order to control the locking motor 27a and the first motor 2, the vehicle Ve is provided with an electronic control unit (hereinafter abbreviated as ECU) 45 as a controller comprising a microcomputer. To this end, various signals are transmitted to the ECU 45 from sensors arranged in the vehicle Ve, and the ECU 45 transmits command signals to the locking motor 27a and the first motor 2 based on the incident data as well as maps and formulas installed therein.

Figure 5:
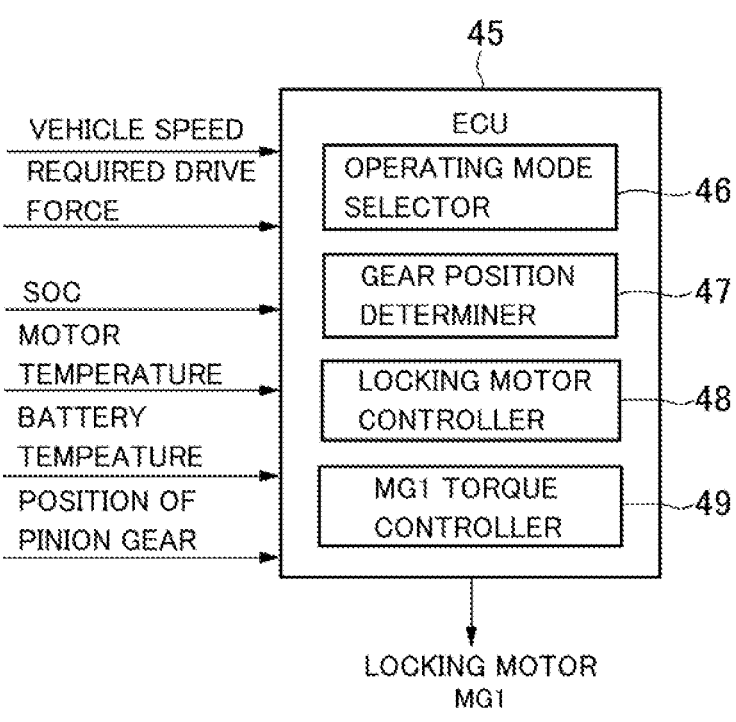
FIG. 5 is a block diagram showing functions of an electronic control unit.

Functions of the ECU 45 are shown in FIG. 5 in more detail. As shown in FIG. 5, the ECU 45 receives signals representing a speed of the vehicle Ve, a required drive force, a state of charge level (hereinafter abbreviated as SOC) of the battery, temperatures of the motors, a temperature of the battery, and a position of the locking gear 26. For example, a speed of the vehicle Ve may be detected by a vehicle speed sensor, and a required drive force may be detected by an accelerator sensor. Specifically, a hybrid battery is adopted as the battery, and the battery is electrically connected with the first motor 2 and the second motor 3. An SOC level of the battery may be estimated based on an output voltage of the battery, and a temperature of the battery may be detected by a thermistor. A position of the locking gear 26 may be not only determined based on a rotational angle of the locking motor 27a or the wheel gear 35 but also detected directly.

The ECU 45 comprises an operating mode selector 46, a gear position determiner 47, a locking motor controller 48, and an MG1 torque controller 49. The operating mode selector 46 is configured to select an operating mode of the vehicle Ve based on a speed of the vehicle Ve, a required drive force, an SOC level of the battery, and a temperature of the battery. Specifically, if the SOC level of the battery is a predetermined level or higher and the temperature of the battery is lower than a predetermined level, the operating mode selector 46 selects the single-motor mode or the dual-motor mode. In this case, the operating mode selector 46 selects the single-motor mode if the speed of the vehicle Ve is low and a required drive force is small. By contrast, the operating mode selector 46 selects the dual-motor mode if the speed of the vehicle Ve is high or the required drive force is large.

The gear position determiner 47 is configured to determine a position of the locking gear 26 based on e.g., a signal representing a rotational angle of the locking motor 27a or the wheel gear 35, and a signal representing a traveling amount of the locking gear 26. Specifically, the gear position determiner 47 determines whether the locking gear 26 is positioned in a locking position where the locking gear 26 is engaged with the flywheel gear 25 or in a disengagement position where the locking gear 26 is disengaged from the flywheel gear 25.

The locking motor controller 48 is configured to move the locking gear 26 to a position to establish the operating mode selected by the operating mode selector 46. For example, in a situation where the operating mode selector 46 selects the dual-motor mode as the first mode and the gear position determiner 47 determines that the locking gear 26 is positioned in the disengagement position, the locking motor controller 48 supplies an electric power to the locking motor 27a in a direction to move the locking gear 26 to the locking position. Whereas, in a situation where the operating mode selector 46 selects the operating mode other than the dual-motor mode, that is, the operating mode selector 46 selects the first mode and the gear position determiner 47 determines that the locking gear 26 is positioned in the locking position, the locking motor controller 48 supplies an electric power to the locking motor 27a in a direction to move the locking gear 26 to the disengagement position.

The MG1 torque controller 49 is configured to transmit a signal to supply an electric power to the first motor 2 when the locking gear 26 is not allowed to be engaged with the flywheel gear 25 due to interference between the top lands of the locking gear 26 and the flywheel gear 25.

Figure 6:
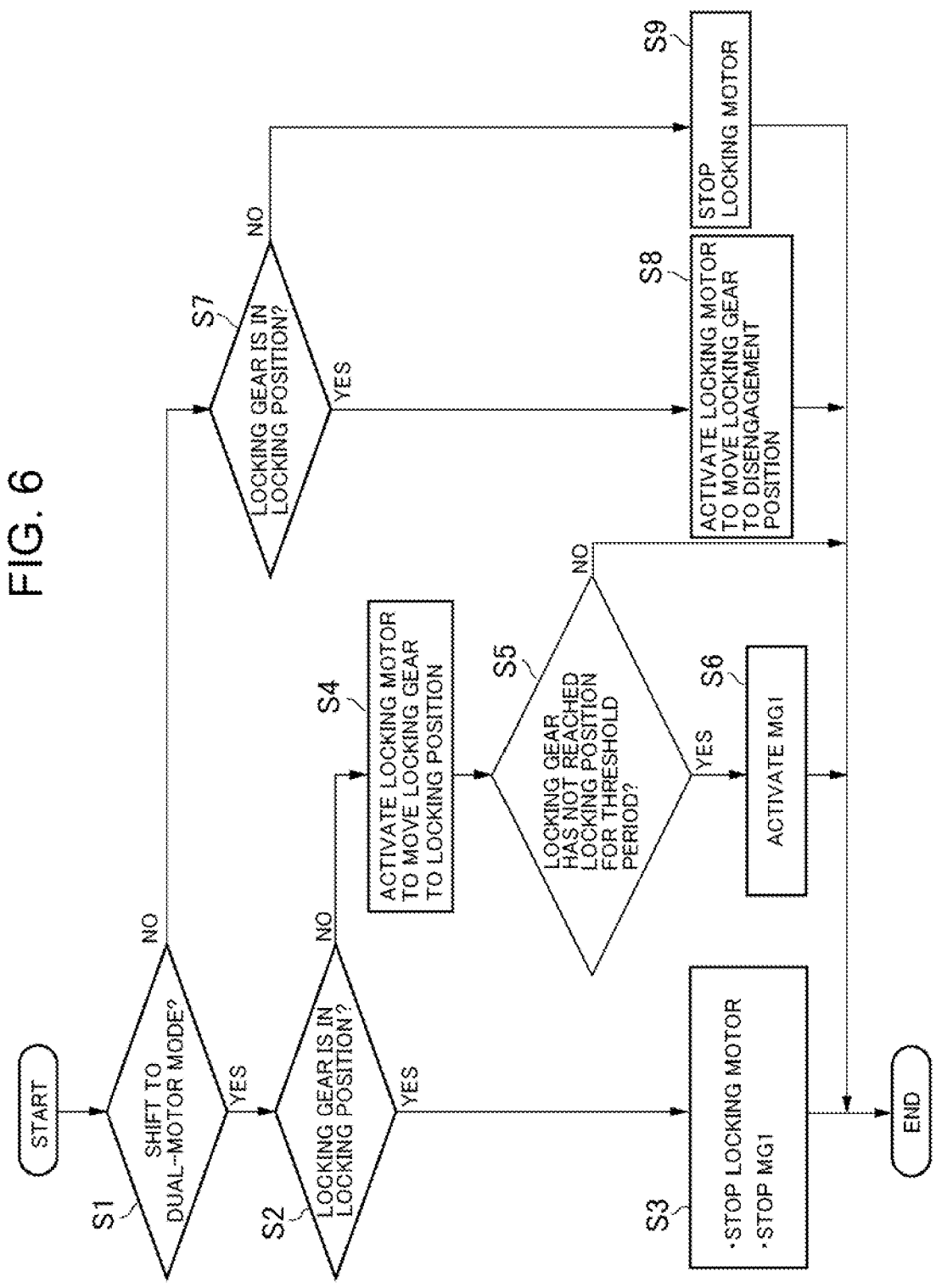
FIG. 6 is a flowchart showing one example of a routine for controlling a locking motor and a first motor.

Turning to FIG. 6, there is shown one example of a routine executed by the ECU 45. At step S1, it is determined whether the condition to shift the operating mode to the dual-motor mode is satisfied. Specifically, such determination at step S1 is made based on a fact that the operating mode selector 46 determines to shift the operating mode from the HV mode or the single-motor mode to the dual-motor mode.

If the operating mode selector 46 determines to shift the operating mode to the dual-motor mode so that the answer of step S1 is YES, the routine progresses to step S2 to determine whether the locking gear 26 is positioned in the locking position. Specifically, such determination at step S2 is made by the gear position determiner 47.

If the locking gear 26 is positioned in the locking position so that the answer of step S2 is YES, the routine progresses to step S3 to transmit a command to stop the locking motor 27a and a command to stop the first motor 2 that generates a torque to allow the locking gear 26 to be engaged with the flywheel gear 25. Consequently, if the locking motor 27a was activated in the previous routine, the electric power supply to the locking motor 27a is stopped. Likewise, if the first motor 2 generated the torque to allow the locking gear 26 to be engaged with the flywheel gear 25, the electric power supply to the first motor 2 is stopped. Thereafter, the routine returns.

By contrast, if the locking gear 26 is not positioned in the locking position so that the answer of step S2 is NO, the routine progresses to step S4 to transmit a command to activate the locking motor 27a to move the locking gear 26 to the locking position. Consequently, the electric power is supplied to the locking motor 27a so that the locking motor 27a generates a torque in the direction to rotate the wheel gear 35 counterclockwise in FIGS. 2 and 3.

Then, it is determined at step S5 whether a period in which the locking gear 26 has not reached the locking position is equal to or longer than a threshold period. In other words, it is determined at step S5 whether the locking gear 26 is not allowed to be moved to the locking position due to interference between the top lands of the locking gear 26 and the flywheel gear 25. In order to make such determination, a required time to move the locking gear 26 to the locking position from the commencement of electric power supply to the locking motor 27a is obtained in advance taking account of a sliding resistance of the brake mechanism 24, and such required time is employed as the threshold period. That is, at step S5, it is determined whether an elapsed time from the commencement of step S4 exceeds the above-mentioned required time as the threshold period.

If the period in which the locking gear 26 has not reached the locking position continues equal to or longer than the threshold period so that the answer of step S5 is YES, it is assumed that the top land of the locking gear 26 comes into contact with the top land of the flywheel gear 25. In this case, therefore, the routine progresses to step S6 to transmit a command to activate the first motor 2 from the MG1 torque controller 49, and thereafter returns. By contrast, if the period in which the locking gear 26 has not reached the locking position is shorter than the threshold period so that the answer of step S5 is NO, the routine also returns.

Whereas, if the operating mode selector 46 determines to shift the operating mode from e.g., the dual-motor mode to another mode so that the answer of step S1 is NO, the routine progresses to step S7 to determine whether the locking gear 26 is positioned in the locking position. Such determination at step S7 may be made by the same procedure as step S2.

If the locking gear 26 is positioned in the locking position so that the answer of step S7 is YES, the routine progresses to step S8 to transmit a command to activate the locking motor 27a to withdraw the locking gear 26 from the locking position. Consequently, the electric power is supplied to the locking motor 27a so that the locking motor 27a generates a torque in the direction to rotate the wheel gear 35 clockwise in FIGS. 2 and 3. Thereafter, the routine returns.

By contrast, if the locking gear 26 is not positioned in the locking position so that the answer of step S7 is NO, the routine progresses to step S9 to transmit a command to stop the locking motor 27a, and thereafter returns.

Figure 7:
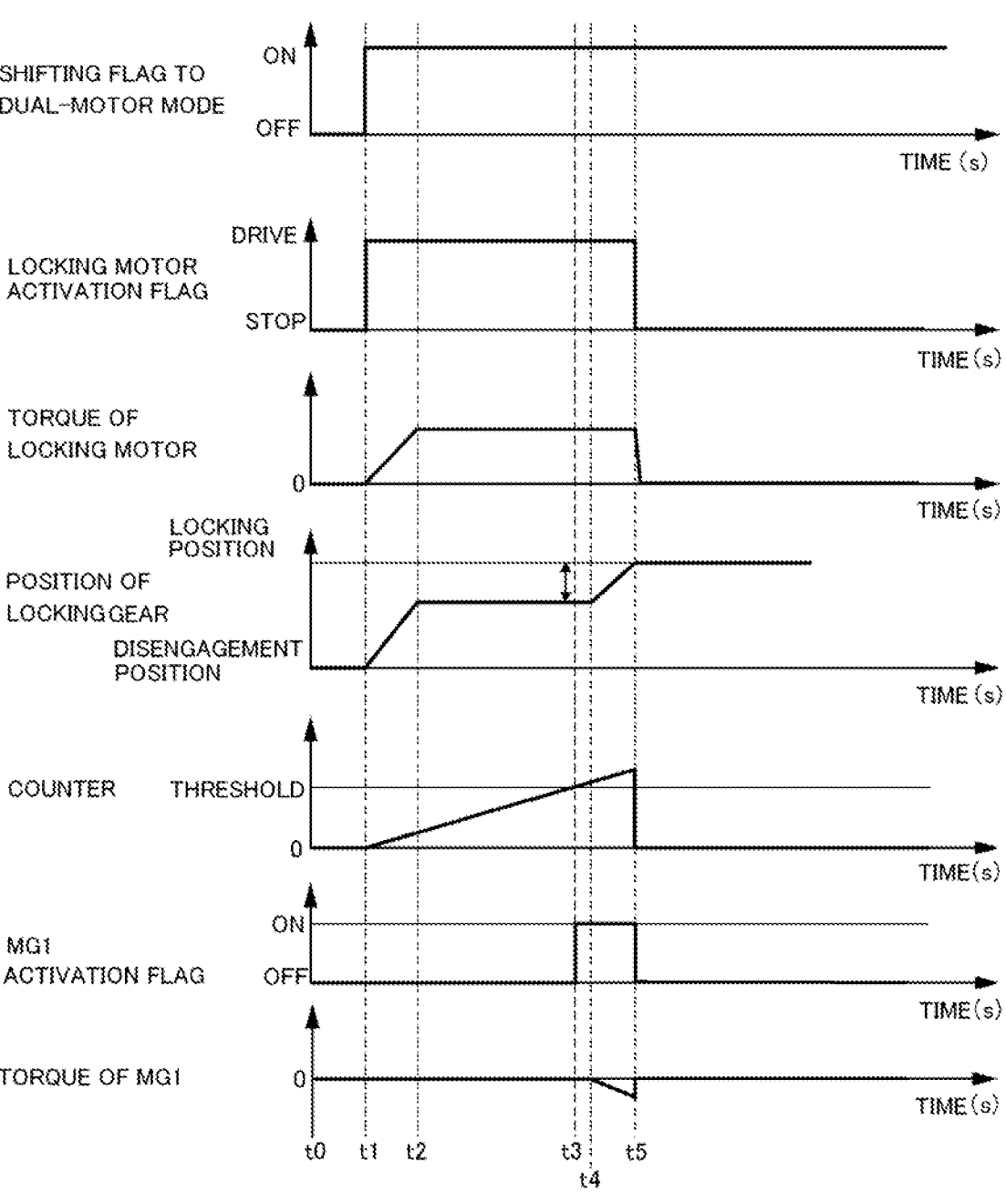
FIG. 7 is a time chart showing temporal changes in conditions of the brake mechanism and the first motor during execution of the routine shown in FIG. 6 in a case of shifting an operating mode to a dual-motor mode.

FIG. 7 is a time chart showing temporal changes in conditions of the brake mechanism 24 and the first motor 2 during execution of the routine shown in FIG. 6 in the case of shifting the operating mode from the second mode to the dual-motor mode as the first mode.

In the example shown in FIG. 7, at point t0, the operating mode other than the dual-motor mode is selected, and the locking gear 26 is therefore positioned in the disengagement position. At point t1, the operating mode selector 46 determines to shift the operating mode to the dual-motor mode. Consequently, a shifting flag to shift the operating mode to the dual-motor mode is turned on at point t1. In this situation, since the locking gear 26 is positioned in the disengagement position, the routine shown in FIG. 6 progresses from step S2 to step S4. In this situation, therefore, the command to activate the locking motor 27a to move the locking gear 26 to the locking position is transmitted. Consequently, an activation flag of the locking motor 27a is turned on, and a torque of the locking motor 27a starts increasing gradually from point t1.

As a result of activating the locking motor 27a, the locking gear 26 starts moving toward the locking position, and the counting of the period in which the locking gear 26 has not reached the locking position commences. At point t1, since the elapsed time from the point at which the activation of the locking motor 27a was started is still shorter than the threshold period, the routine shown in FIG. 6 returns from step S5. Therefore, an activation flag of the first motor 2 is still off at point t1. In the example shown in FIG. 7, the first motor 2 is stopped in this situation, however, if it is necessary to operate the first motor 2 for any other purpose, the first motor 2 may be operated to generate a torque according to need.

In the example shown in FIG. 7, the top land of the locking gear 26 comes into contact with the top land of the flywheel gear 25 at point t2. Therefore, the locking gear 26 stays at a predetermined position after point t2.

The top land of the locking gear 26 stays in contact with the top land of the flywheel gear 25 for the threshold period. Consequently, the period in which the locking gear 26 has not reached to the locking position reaches the threshold period at point t3. In this situation, the routine shown in FIG. 6 progresses from step S5 to step S6 so that the activation flag of the first motor 2 is turned on at point t3. As a result, the first motor 2 starts generating a torque from point t4 to rotate the flywheel 5 so that the flywheel gear 25 is rotated to be out of phase with the locking gear 26. In this situation, therefore, the locking gear 26 starts moving toward the locking position from point t4. To this end, in the example shown in FIG. 7, the first motor 2 generates the torque in the opposite direction to the rotational direction of the engine 1 (i.e., in the direction to propel the vehicle Ve in the forward direction).

The locking gear 26 reaches the locking position at point t5. Consequently, the activation flag of the locking motor 27*a* is turned off at point t5 so that the torque of the locking motor 27*a* is reduced to zero. Likewise, the activation flag of the first motor 2 is turned off at point t5 so that electric power supply to the first motor 2 is stopped and the torque of the first motor 2 is also reduced to zero.

Figure 8:
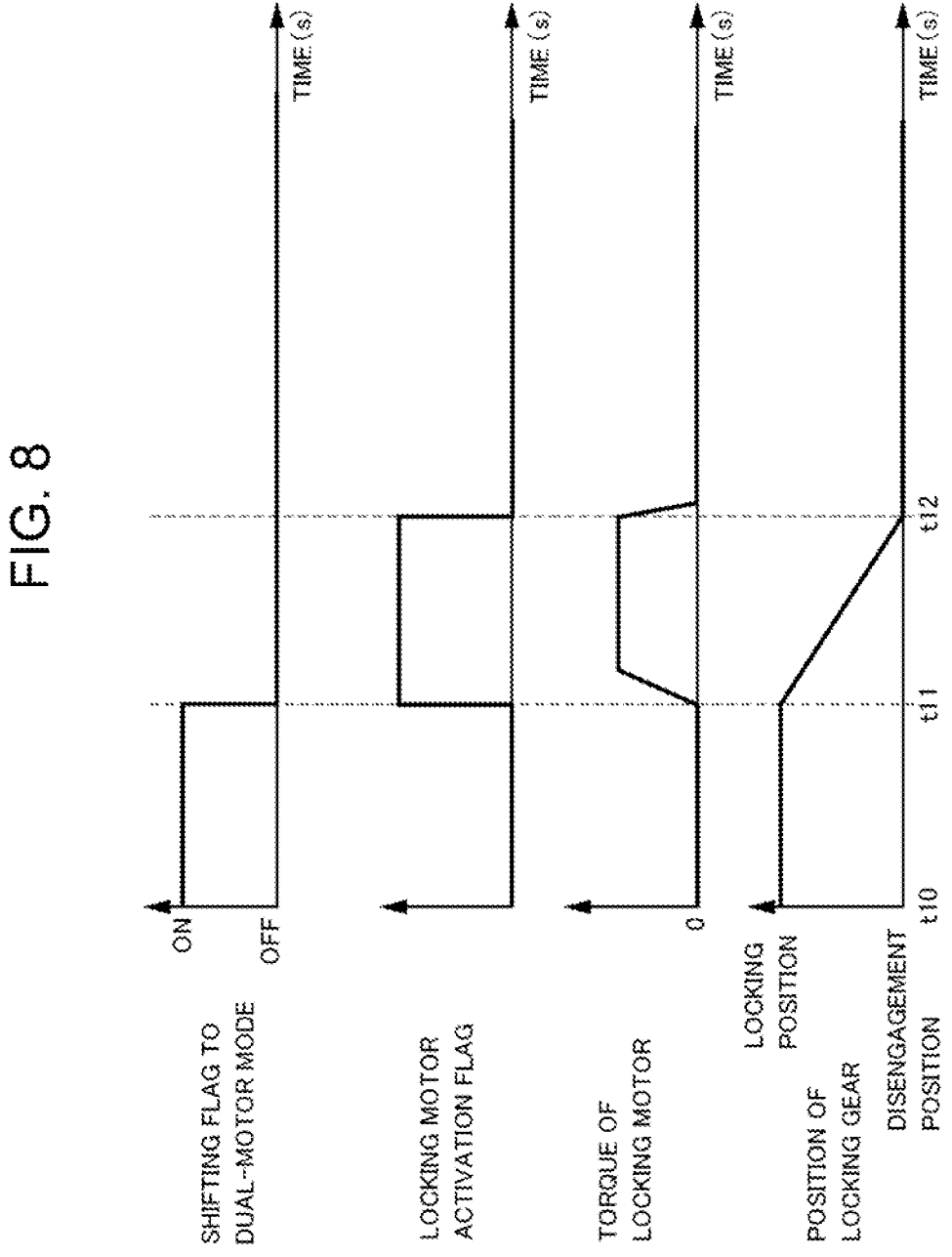
FIG. 8 is a time chart showing temporal changes in conditions of the brake mechanism during execution of the routine shown in FIG. 6 in a case of shifting the operating mode from the dual-motor mode.

FIG. 8 is a time chart showing temporal changes in conditions of the brake mechanism 24 during execution of the routine shown in FIG. 6 in the case of shifting the operating mode from the dual-motor mode as the first mode to the second mode.

In the example shown in FIG. 8, the vehicle Ve is propelled in the dual-motor mode at point t10, therefore, the locking gear 26 is positioned in the locking position in this situation. At point t11, the operating mode selector 46 determines to shift the operating mode to another mode. Consequently, the activation flag of the locking motor 27*a* is turned on at point t11, and the command to activate the locking motor 27*a* is transmitted at step S8 of the routine shown in FIG. 6. In this situation, therefore, the torque of the locking motor 27*a* increases gradually from point t11.

As a result, the locking gear 26 starts withdrawing toward the disengagement position from point t11, and reaches the disengagement position at point t12. In this situation, therefore, electric power supply to the locking motor 27*a* is stopped at point t12 so that the torque of the locking motor 27*a* is reduced to zero.

Thus, according to the exemplary embodiment of the present disclosure, the locking gear 26 is reciprocated between the locking position and the disengagement position. According to the exemplary embodiment of the present disclosure, therefore, a power loss resulting from rotating the locking gear 26 may be reduced during propulsion in the HV mode or the single-motor mode in which the locking gear 26 is positioned in the disengagement position.

In addition, according to the exemplary embodiment of the present disclosure, the flywheel gear 25 is formed around the flywheel 5 whose diameter is relatively large, and a rotation of the flywheel 5 is restricted by engaging the locking gear 26 with the flywheel gear 25. According to the exemplary embodiment of the present disclosure, therefore, a load acting on the locking gear 26 may be reduced. For this reason, the locking gear 26 may be downsized.

Further, according to the exemplary embodiment of the present disclosure, the locking gear 26 is adapted to be reciprocated along the axis parallel to the rotational center axis of the flywheel 5. According to the exemplary embodiment of the present disclosure, therefore, the actuator 27 may be attached to the outer surface of the engine 1 to reciprocate the locking gear 26. That is, the actuator 27 may be mounted easily on the vehicle Ve.

Figures 9A, 9B:
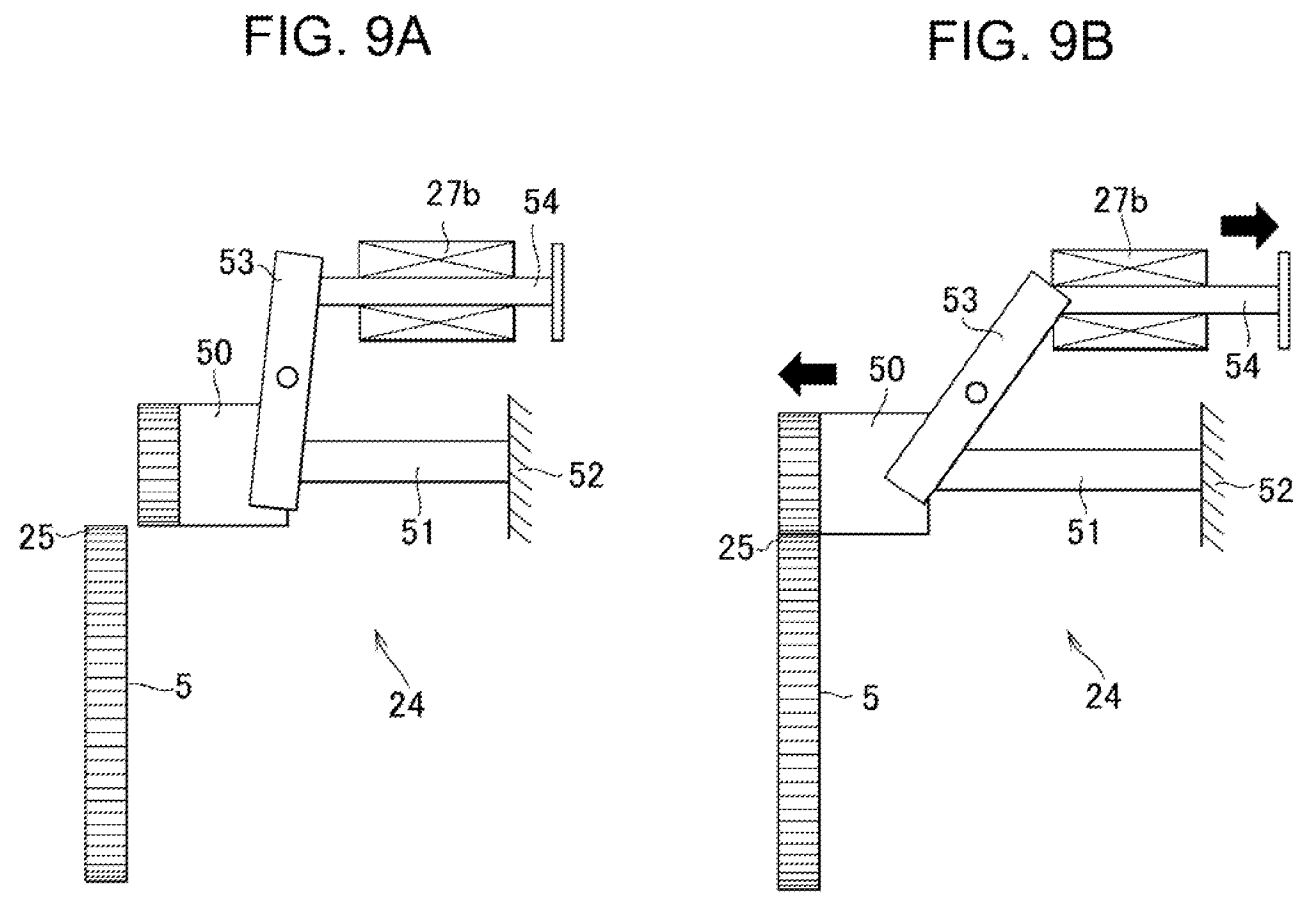

Turning to FIGS. 9A and 9B, there is shown another example of the brake mechanism 24 in which an actuator having a solenoid is employed instead of the locking motor 27*a*. As illustrated in FIGS. 9A and 9B, the brake mechanism 24 according to another example is provided with a locking gear 50, and the locking gear 50 is also reciprocated between the locking position to be engaged with the flywheel gear 25 and the disengagement position to be disengaged from the flywheel gear 25.

Specifically, the locking gear 50 has a cylindrical shape, and spline teeth are formed on an inner circumferential surface of the locking gear 50. A leading end of a support shaft 51 on which spline teeth are formed is inserted into the locking gear 50, and the other end of the support shaft 51 is joined to a stationary member 52 such as a casing. Thus, the locking gear 50 is splined onto the support shaft 51.

A fork 53 is joined to the locking gear 50 so that the locking gear 50 is reciprocated in an axial direction by the fork 53. To this end, annular grooves are formed on an outer circumferential surface of the locking gear 50, and one end of the fork 53 is engaged with the annular grooves.

Specifically, the fork 53 extends in a direction intersecting with a rotational center axis of the support shaft 51. An intermediate portion of the fork 53 is pivotally supported by the stationary member 52, and a plunger 54 made of magnetic material is joined to the other end of the fork 53. Therefore, the fork 53 is rotated pivotally by reciprocating the plunger 54 thereby reciprocating the locking gear 50.

The plunger 54 penetrates through a solenoid 27*b* serving as the actuator 27 while being allowed to reciprocate in its axial direction. Specifically, the other end of the fork 53 is pushed by the plunger 54 by energizing the solenoid 27*b*. In addition, in order to apply a load to the plunger 54 in an opposite direction to an electromagnetic force applied to the plunger 54, the brake mechanism 24 shown in FIGS. 9A and 9B is provided with a reaction mechanism such as a return spring (not shown).

As illustrated in FIG. 9A, in a situation where the solenoid 27*b* is not energized, the plunger 54 is moved toward the left side in FIG. 9A (i.e., toward the disengagement position) by the load applied from the reaction mechanism thereby withdrawing the locking gear 50 from the flywheel gear 25. Whereas, in a situation illustrated in FIG. 9B where the solenoid 27*b* is energized, the electromagnetic force is applied to the plunger 54 in accordance with the electric power supplied to the solenoid 27*b*. In this situation, when the electromagnetic force applied to the plunger 54 overwhelms the load applied to the plunger 54 from the reaction mechanism, the plunger 54 is moved toward the right side in FIG. 9B (i.e., toward the locking position) by the electromagnetic force thereby bringing the locking gear 50 into engagement with the flywheel gear 25.

In the situation where the locking gear 50 is in engagement with the flywheel gear 25, the vehicle Ve is allowed to be propelled by the drive torque generated by the first motor 2. Nonetheless, electric consumption in the vehicle Ve will be increased as long as the electric power supply to the solenoid 27*b* is continued to maintain the engagement between the locking gear 50 and the flywheel gear 25. In order to avoid such increase in the electric consumption, as illustrated in FIGS. 10A and 10B, the brake mechanism may be modified to maintain the engagement between the locking gear 50 and the flywheel gear 25 without energizing the solenoid 27*b* in the situation where the torque of the first motor 2 is applied to the flywheel 5 in the direction to propel the vehicle Ve in the forward direction.

Figures 10A, 10B:
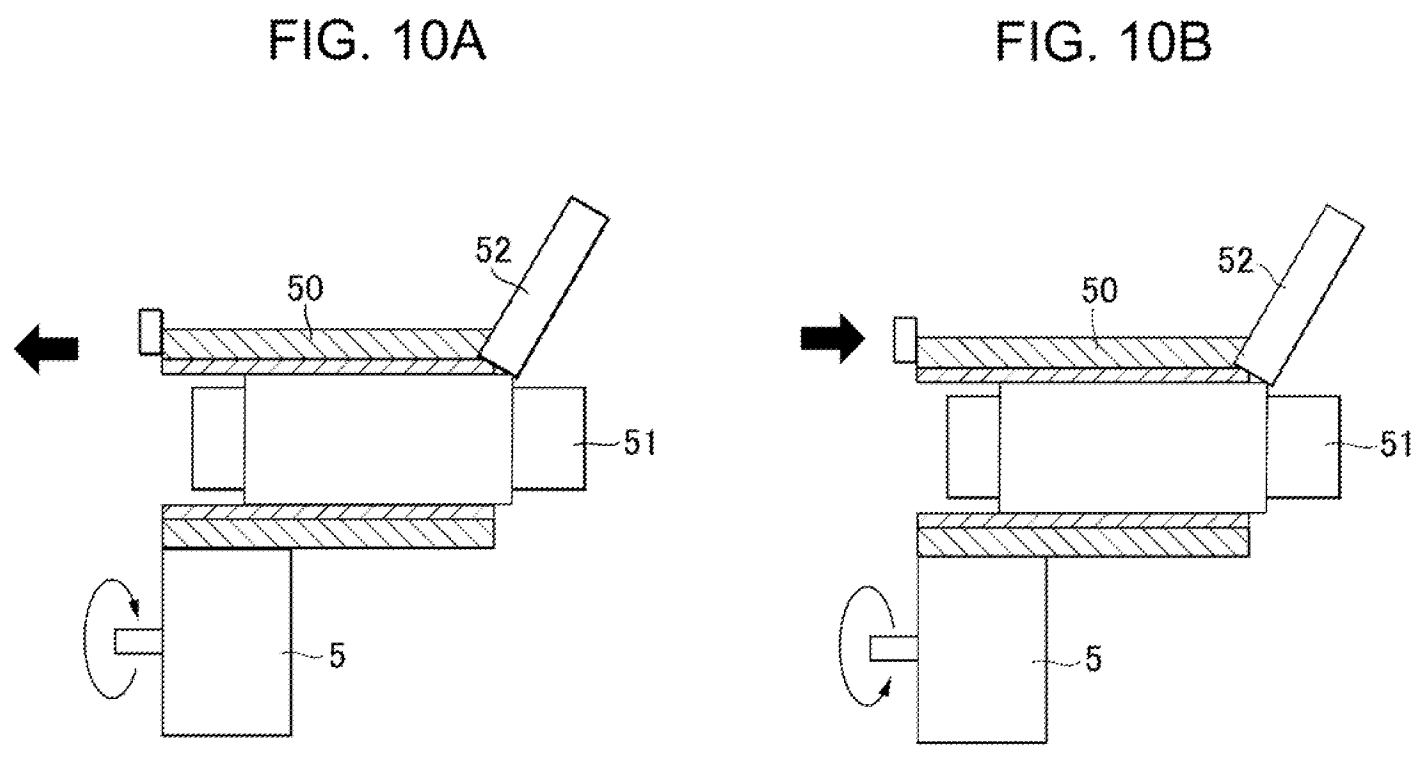

In the brake mechanism shown in FIGS. 10A and 10B, the spline teeth of the locking gear 50 and the spline teeth of the support shaft 51 are individually angled with respect to the axis of the support shaft 51. Specifically, the spline teeth of the locking gear 50 and the spline teeth of the support shaft 51 are angled such that the spline teeth of the locking gear 50 establish a component of a reaction load applied from the spline teeth of the support shaft 51 in a direction to maintain the engagement between the locking gear 50 and the fly-wheel gear 25 (i.e., toward the left side in FIG. 10A), when the spline teeth of the locking gear 50 are brought into contact with the spline teeth of the support shaft 51 by the torque rotating the flywheel 5 in the direction indicated in FIG. 10A. That is, the locking gear 50 may be maintained to the locking position without energizing the solenoid 27*b*.

As illustrated in FIG. 10B, when the engine 1 generates a torque, the torque is applied to the flywheel 5 in the opposite direction to the direction of the torque applied to the flywheel 5 during propulsion in the dual-motor mode. There-fore, when shifting the operating mode from the dual-motor mode to the HV mode, the engine 1 may be started without waiting a disengagement of the locking gear 50 from the flywheel gear 25. For this reason, such shifting operation from the dual-motor mode to the HV mode may be com-pleted promptly.

Thus, in the example shown in FIGS. 10A and 10B, the engagement between the locking gear 50 and the flywheel gear 25 is maintained utilizing the torque applied to the locking gear 50. However, the engagement between the locking gear 50 and the flywheel gear 25 may also be maintained by a dedicated mechanism to maintain the engagement between those gears.

Although the above exemplary embodiment of the present disclosure has been described, it will be understood by those skilled in the art that the present disclosure should not be limited to the described exemplary embodiments, and vari-ous changes and modifications can be made within the scope of the present disclosure. For example, a double-pinion planetary gear unit or a complex differential mechanism having four or more rotary elements may also be adopted as the power split mechanism 7 instead of the single-pinion planetary gear unit. In addition, the second motor 3 may also be connected to another pair of wheels instead of the drive wheels 11.

What is claimed is:

1. A hybrid vehicle, comprising:
an engine;
a flywheel having an external gear that is connected to an output shaft of the engine;
a motor;
a power split mechanism that performs a differential action among a first rotary element connected to the flywheel, a second rotary element connected to the motor, and a third rotary element connected to a pair of drive wheels;
a locking gear that is allowed to reciprocate between a locking position in which the locking gear is engaged with the external gear of the flywheel, and a disengage-ment position in which the locking gear is disengaged from the external gear of the flywheel;
an actuator that pushes the locking gear to the engagement position so as to establish a brake torque counteracting a torque of the external gear of the flywheel, and that withdraws the locking gear from the external gear of the flywheel; and
a torque limiter that stops a rotation of the locking gear when a torque applied to the locking gear is less than an upper limit torque, and that allows the locking gear to rotate when the torque applied to the locking gear is equal to the upper limit torque or greater, wherein the locking gear is mounted on a support shaft, and the torque limiter is configured to apply the torque to the support shaft to stop the rotation of the locking gear by a frictional force,
wherein an operating mode of the hybrid vehicle includes:
a first mode in which the hybrid vehicle is propelled by a drive torque generated by the motor while positioning the locking gear in the locking position to engage the locking gear with the external gear of the flywheel and; and
a second mode in which the hybrid vehicle is propelled while positioning the locking gear in the disengage-ment position to disengage the locking gear from the external gear of the flywheel.

2. The hybrid vehicle as claimed in claim 1, wherein the locking gear is reciprocated between the locking position and the disengagement position along an axis parallel to a rotational center axis of the flywheel.

3. The hybrid vehicle as claimed in claim 1, further comprising:
a controller that controls the motor,
wherein the controller is configured to generate a torque by the motor to rotate the flywheel in a situation where the locking gear being pushed from the disengagement position toward the locking position does not reach the locking position within a threshold period.

4. The hybrid vehicle as claimed in claim 1, further comprising:
another motor that is connected to the pair of drive wheels or another pair of wheels in a torque transmittable manner,
wherein the first mode includes a mode in which the hybrid vehicle is propelled by the torque generated by the motor and a torque generated by the another motor.

* * * * *